United States Patent Office 3,658,733
Patented Apr. 25, 1972

3,658,733
PHENOL ALDEHYDE WATER-RESISTANT STARCH-BASED ADHESIVES AND THEIR PREPARATION
Jean-Marc Billy, Outremont, Quebec, Canada, assignor to The Ogilvie Flour Mills Company, Limited, Montreal, Quebec, Canada
No Drawing. Filed Apr. 25, 1969, Ser. No. 819,464
The portion of the term of the patent subsequent to Aug. 18, 1987, has been disclaimed
Int. Cl. B32f 27/42; C08g 37/18
U.S. Cl. 260—17.2
8 Claims

ABSTRACT OF THE DISCLOSURE

A starch adhesive composition is prepared by the in situ polymerization of partially gelatinized starch granules, a phenolic compound and an aldehyde to form a water-dispersible resin. The resin is formed in a caustic aqueous slurry. The adhesive composition has a smooth and substantially uniform consistency, and it is well-suited for use in the manufacture of laminated and corrugated paperboard.

---

This invention relates, broadly, to a novel starch-based adhesive composition and to an improved process for its preparation. More specifically, the invention is concerned with a starch-based adhesive composition which includes a water-dispersible, co-condensation resin derived from the in situ polymerization of partially gelatinized starch granules, a phenol and formaldehyde and an improved process for its preparation utilising a single homogeneous composition composed of partially swollen starch granules. The starch-based adhesives of this invention are especially well suited to the manufacture of laminated and corrugated paperboard and are capable, on curing, of imparting water resistance to adhesive bonds in the paperboard products.

At the present time, corrugated paperboard is manufactured in a continuous operation in which a heat-setting adhesive is applied, in a first stage, to the tips of a heated fluted paper interlayer which is then contacted, under heat and pressure, with a strip of liner paper to form a strong adhesive bond between the two layers. The resulting flexible paperboard is known in the art as a single faced material. To form rigid corrugated paperboard, additional adhesive is applied to the exposed fluted tips in a further operation, a second strip of liner brought into contact therewith, and an adhesive bond formed between the two layers by exposure to heat and pressure in a double backer machine.

Starches of different types have been extensively used for many years as the heat-setting adhesive in the manufacture of corrugated and other sorts of paperboard. Conventionally, these starch adhesives consist of two fractions, one called the primary or carrier portion, the other the secondary fraction. The primary fraction contains cooked or gelatinised starch which serves as the suspension medium or carrier for the raw starch of the secondary fraction. The two fractions are normally prepared separately in two containers and then mixed. The cooked starch is then added to, and thoroughly mixed with, the raw starch slurry with the cooked starch serving as a suspension medium or carrier for the raw starch portion so that it can be transported to the corrugating machine. Thereafter, it is applied to the tips of the corrugations, the liner is brought into contact with the tips, and heat is applied, thereby readily gelatinising the starch. This in situ gelatinisation provides a much stronger bond between the medium and liner than when paste starch is employed. This in situ gelatinisation provides the bond, and it is well recognized and accepted that such a bond is not waterproof and does not have adequate water resistance for a number of purposes. Numerous attempts have been made to improve the water resistance properties of starch adhesive bonds, and a common method in use at the present time, is to incorporate into the starch a water-dispersible resin, such as a urea-formaldehyde, melamine-formaldehyde or acetone-formaldehyde resin. More recently, it has been proposed to incorporate the resin components, say, urea and formaldehyde as individual constituents and, thereafter, to co-polymerise them with the starch.

As an alternative to the conventional, so called "carrier" process, as described above, starch corrugating adhesives may be made by a process involving only one lot of starch which results in an adhesive composed of an essentially homogeneous mass of partially swollen starch granules, rather than the conventional, two-component carrier formulation. In this process, as discussed in, for example, Tappi, vol. 50, No. 8, 1967, p. 58A, all of the starch granules are slurried in water, and then sufficient alkali is added to produce an incipient pasting. The starch is allowed to swell, without becoming completely gelatinised, until the viscosity of the starch reaches a desired level, which is appropriate for the end use envisaged for the starch adhesive. The amount of alkali used is carefully controlled. When the starch swells sufficiently to give the desired viscosity, the swelling is arrested, for instance, by the addition of a reaction stopper such as borax, alum, or an acid material such as hydrochloric acid.

The present invention is concerned with a process of the "no-carrier" type. Its primary object, generally stated, is the provision of a modified and improved no-carrier process adapted and directed to the obtention of a starch-based adhesive capable of forming water resistant bonds in corrugated and other paperboard products.

Accordingly, therefore, the present invention provides, in one of its aspects, a process for preparing a starch-based adhesive composition particularly suitable for use in the manufacture of laminated and corrugated paperboard, and capable of imparting water resistance to adhesive bonds in the paperboard products which comprises, in combination, the following sequence of essential steps:

(i) preparing an aqueous caustic solution;
(ii) adding granular starch to the solution rapidly and uninterruptedly in an amount such that the resulting slurry contains between about 15% and about 30% starch solids by weight;
(iii) raising the temperature of the slurry whereupon the starch granules swell so thickening the slurry;
(iv) permitting the swelling to continue until a Zahn #3 viscosity of about 12 to about 60 seconds is attained;
(v) with the individual starch grandules only partially gelatinised, adding between about 2% and about 8%, based on the initial starch weight, of a phenolic compound as a reaction stopper; and
(vi) finishing the adhesive by adding simultaneously with, or subsequently to, the phenolic compound, an aldehyde in an amount such that the molar ratio of aldehyde to phenol is greater than 1 to 1 and preferably between about 1 to 1 and 2 to 1.

The invention, in another of its aspects, provides a starch-based adhesive composition particularly suitable for use in the manufacture of laminated and corrugated paperboard, and capable of imparting water resistance to adhesive bonds in the paperboard products which comprises a slurry containing the following component:

(i) water;
(ii) caustic; and
(iii) a water-dispersible co-condensation resin obtained from the in situ polymerization of partially gelatinized starch granules, a phenolic compound and an aldehyde, said components being present in proportions such that the composition contains between about 15% and about 30% startch solids by weight, between about 2% and about 4% by weight, based on the initial starch weight, caustic, and between about 2% and about 15% by weight, preferably between about 4.5% and about 10% by weight, based on the initial starch weight, of the water-dispersible resin, and the composition has a pH of between about 9 and about 12, a gel temperature of between about 131° and about 161° F. and a viscosity of between about 12 and about 30, preferably between about 12 and 25, Zahn #3 seconds.

In practicing the invention, all the formula water, all the caustic and all the starch are added, in that order, to a single mixing tank. In a preferred procedure, a definite calculated amount of caustic is dissolved in the formula water and the solution preheated to around 70° F. simply to minimise variations resulting from differences in water temperature in summer and winter. The starch is then added uninterruptedly and as rapidly as possible to the caustic solution which is continuously agitated during, and subsequent to, the addition. At this stage, there is virtually no swelling of the starch so that the viscosity remains stable, at around 8 Zahn #3 seconds, and the slurry may, if required, be stored indefinitely.

Swelling of the individual starch granules is initiated by raising the slurry temperature, conveniently by direct steam injection. The temperature at which swelling of the individual starch granules becomes pronounced varies, depending primarily on the ratio of caustic to starch to water. Advantageously, a ratio is selected, conveniently by adjusting the caustic concentration, which will provide an appropriate degree of swelling at a temperature in the range of between about 102° to about 110° F., preferably between about 103° to about 105° F. A temperature in the foregoing broad range is convenient for it corresponds to the normal storage and operating temperatures in pasteboard factories. Moreover, it is generally associated with a gradual and, therefore, readily controllable swelling when the caustic level is properly adjusted such that, over a short period of time, say 10 to 15 minutes, the viscosity reaches the desired level, as measured by a Zahn cup viscometer #3, of 12 to 60 seconds, preferably 12 to 30 seconds. A viscosity level within the broad range is appropriate to a mass of only partially swollen starch granules.

The concentration of caustic required to swell the starch to the desired extent at a temperature within this range normally varies between about 0.5 percent and about 0.8 percent based on the weight of the water. Preferably, the proportions of the caustic, starch and water fall within the following ranges: the actual proportions in a given instance depending again on the type of starch used and the concentration desired.

|  | Parts |
|---|---|
| Water | 180–300 |
| Caustic | 1–3.5 |
| Starch | 40–80 |

While it is generally convenient to arrange for the viscosity to increase steadily over a definite, short period, for then the rise in viscosity can be readily monitored by a paperboard factory operator using a cup viscometer, it is also prossible to increase the viscosity more rapidly by raising the temperature a few degrees above the temperature in the foregoing range at which swelling initially becomes pronounced. Similarly, by lowering the temperature a degree or two, the rate of swelling can be decreased. In other words, the rate of swelling can be adjusted to any desired level by either raising or lowering the final temperature by a degree or so.

As indicated hereinbefore, in the process of this invention, raw starch is chemically treated to produce a homogeneous suspension of partially swollen starch granules. When the viscosity reaches the desired, preselected level, which is compatible with partial, rather than complete, swelling, the swelling is arrested by the addition of a phenolic compound to the system. The amount of phenolic compound added to the system is adjusted according to the desired final viscosity, which is 12 to 30 Zahn #3 seconds, and the degree of water-resistance sought to be imparted. For a good balance between these two properties sought, it is necessary that the phenol should be added in an amount of between about 2% and about 8%, preferably between about 3% and about 7%, based on the initial starch weight. The phenolic compound may be added in solid, say flake form or in solution, and it may be added along with another reaction stopper, for example, borax or alum.

Simultaneously with, or subsequently to, the addition of the phenolic compound, an aldehyde is added to finish the adhesive. At this point, since all the indivdual starch granules are partially swollen, all are highly reactive and available for co-polymerisation. Accordingly, on addition of the aldehyde, polymerisation between the starch, phenolic compound and aldehyde occurs, and a water-resistant adhesive is obtained. Thereafter, the adhesive is ready for direct use as a laminating or corrugating adhesive. With respect to the aldehyde concentration, it is more convenient and preferable to state this in the form of a ratio to the phenolic compound concentration. In practice, it has been found that the aldehyde should always be present in an excess over the phenolic compound, and conveniently it is added in an amount such that the aldehyde to phenol ratio is about 2:1.

As to the starch reactant which may be employed in this invention, in general, any commercially available starch is suitable. Examples include corn starch, wheat starch (which is preferred because it exhibits a progressive swelling pattern), tapioca starch and the like, and chemically modified ungelatinised starches such as acid-modified and oxidised starches and chemical derivatives of starch such as the starch ethers described in our co-pending United States application, Ser. No. 413,984 filed Nov. 25, 1964, now U.S. Pat. No. 3,448,101. As for the caustic, the preferred material, on economic grounds, is sodium hydroxide in flake form or in solution, but other alkaline materials such, for example, as potassium hydroxide may be employed, and the term "caustic" as used herein and in the appended claims is to be interpreted in this sense.

The preferred phenolic compound for use in this invention is resorcinol, although other compounds such, for example, as phenol itself, phloroglucinol and pyrocatechol, may be used, and the preferred aldehyde is formaldehyde, although other compounds such, for example, as furfural, glyoxal and acetaldehyde, may be used. Best results are obtained with a resorcinol-formaldehyde combination.

The invention is further described, by way of illustration only, by the following examples. In these examples, reference is made to the gel temperature and Zahn #3 viscosity. The gel temperature measurements were made following the standard procedure described at page 16 of Special Tech. Assoc. Publ. No. 3, Tappi, 1965. The viscosity measurements were made by means of a Zahn #3 cup viscometer which is a bullet-shaped, stainless steel cup with an orifice in its base; the viscosity of the starch adhesive, when measured by the Zahn #3 viscometer, is expressed in Zahn #3 seconds; that is, the time required for a definite volume (44 cc.) of the material to flow through the orifice in the bottom of the metal cup.

In these examples, the water-resistance is determined in the following manner. One drop of the adhesive to be tested is pressed between 2" x 2" samples of a corrugating liner and a medium, and the adhesive is cured by heating under a weight of 200 g. on a hot plate at a temperature of 300–350° C. for 10 seconds. The sample is allowed to dry by standing in ambient temperature for 1 hr. It is then immersed in a trough containing cold water which completely covers the sample. After 24 hrs. the sample is removed from the trough and evaluated for water-resistance by tearing the liner from the fluted medium. If the liner and the medium separate freely in the 24 hrs. of immersion, the rating is "none."

EXAMPLE 1

4.8 g. of sodium hydroxide flakes were added to 850 ml. of water at 75° F. 180 g. of pearl wheat starch were added rapidly and uninterruptedly in one lot to give a slurry having a stable Zahn #3 viscosity of 8 seconds. The slurry, while being continuously agitated, was heated by direct steam injection, to 104° F., at which temperature the slurry began to thicken, and after 10 minutes the viscosity had risen to 26 seconds Zahn #3. The swelling was arrested by adding 5.4 g. (3% of initial starch weight) resorcinol flakes and, then, 7.84 g. of 40% formaldehyde solution (formaldehyde:resorcinol=2.1:1). The mixture was stirred for 10 minutes to give an adhesive having the following properties:

Starch solids content: 15.5%
pH: 11.1
Gel temperature: 147° F.
Zahn #3 viscosity: 12 seconds
Water-resistance rating: excellent The odour of formaldehyde was negligible, and the adhesive cured to a water-resistant bond when heated.

EXAMPLE 2

This example illustrates the preparation of a waterproof corrugating adhesive using 6% resorcinol to the starch weight, and formaldehyde.

180 grams of wheat starch was added to a solution of sodium hydroxide prepared from 4.8 gms. of NaOH and 850 ml. of tap water, and preheated to about 70° F.

The resulting slurry, which had a Zahn #3 viscosity of 8 seconds, was heated to 108° F. with direct steam injection while maintaining constant stirring. The slurry began to thicken due to the progressive swelling of all the granules and it was maintained at 108° F. until the viscosity increased to the point where the liquid would not flow through the orifice of the Zahn cup. This required some 12 minutes. The pH of the slurry was 11.6 at this point.

10.8 grams (6% of initial starch weight) resorcinol flakes were then added, and this caused the pH to drop to 10.2, and the viscosity to 14 Zahn #3 seconds. The adhesive was completed by adding 15.68 g. of 40% aqueous formaldehyde solution. This is equivalent to a molar ratio of formaldehyde to resorcinol of 2.1/1. The final viscosity was 14 Zahn #3 seconds, and this viscosity remained unchanged after holding for two hours. The gel point of the adhesive was 154° F., the pH was 10.2, and the starch solids content was 15.5 percent.

I claim:

1. A starch-based adhesive composition, particularly suitable for use in the manufacture of laminated and corrugated paperboard, and capable of imparting water resistance to adhesive bonds in the paperboard products which has been prepared by the process which comprises the following consecutive steps integrated in the overall process in the sequence given:
   (i) preparing an aqueous caustic solution;
   (ii) adding granular starch to the solution rapidly and uninterruptedly in an amount such that the resulting slurry contains between about 15 percent and about 30 percent by weight of starch solids, the starch solution temperature being around 70° F. and there being virtually no swelling of the starch granules;
   (iii) raising the temperature of the slurry whereupon the starch granules swell so thickening the slurry;
   (iv) permitting the swelling to continue until a Zahn #3 viscosity of about 12 to about 60 seconds is attained;
   (v) with the individual starch granules only partially gelatinized adding between about 2 percent and about 8 percent by weight based on the initial starch weight, of a phenolic compound as a reaction stopper; and
   (vi) finishing the adhesive by adding simultaneously with, or subsequently to, the phenolic compound, an aldehyde in an amount such that the molar ratio of aldehyde to phenolic compound is greater than 1 to 1.

2. An adhesive composition as described in claim 1 wherein the water-dispersible co-condensation resin contains between about 2 percent and about 8 percent of the phenolic compound and the aldehyde, the weight thereof being based on the initial starch weight, the aldehyde and the phenolic compound each being present in an amount such that the molar ratio of the aldehyde to the phenolic compound is between about 1 to 1 and about 2 to 1.

3. An adhesive composition as described in claim 2 wherein the aldehyde and the phenolic compound is present in an amount between about 4.5 percent and 10 percent by weight, based on the initial starch weight, wherein the water-dispersible co-condensation resin contains between about 3 percent and about 7 percent by weight, based on the initial starch weight, of the phenolic compound and the aldehyde, and wherein the aldehyde and the phenolic compound are each present in an amount such that the molar ratio of the aldehyde to the phenolic compound is about 2 to 1.

4. An adhesive composition as described in claim 1 wherein the viscosity is between about 12 and about 25 Zahn #3 seconds.

5. An adhesive composition as described in claim 1 wherein the phenolic compound is resorcinol, and the aldehyde is formaldehyde.

6. A process for preparing a starch-based adhesive composition particularly suitable for use in the manufacture of laminated and corrugated paperboard, and capable of imparting water resistance to adhesive bonds in the paperboard product which comprises the following consecutive steps integrated in the overall process in the sequence given:
   (i) preparing an aqueous caustic solution;
   (ii) adding granular starch to the solution rapidly and uninterruptedly in an amount such that the resulting slurry contains between about 15 percent and about 30 percent by weight of starch solids, the starch solution temperature being around 70° F. and there being virtually no swelling of the starch granules;
   (iii) raising the temperature of the slurry whereupon the starch granules swell so thickening the slurry;
   (iv) permitting the swelling to continue until a Zahn #3 viscosity of about 12 to about 60 seconds is attained;
   (v) with the individual starch granules only partially gelatinized adding between about 2 percent and about 8 percent by weight based on the initial starch weight, of a phenolic compound as a reaction stopper; and
   (vi) finishing the adhesive by adding simultaneously with, or subsequently to, the phenolic compound, an aldehyde in an amount such that the molar ratio of aldehyde to phenolic compound is greater than 1 to 1.

7. A process as described in claim 6 wherein the phenolic compound is resorcinol added in an amount of between about 3 percent and about 7 percent by weight, based on the initial starch weight; and wherein the molar ratio of aldehyde to phenolic compound is between about 1 to 1 and 2 to 1.

8. A process as described in claim 6 wherein the proportions of water, caustic and starch employed are as follows:

| | Parts |
|---|---|
| Water | 180–300 |
| Caustic | 1–3.5 |
| Starch | 40–80 |

References Cited

UNITED STATES PATENTS

| | | | |
|---|---|---|---|
| 2,650,205 | 8/1953 | Kesler et al. | 260—17.2 |
| 2,884,389 | 4/1959 | Corwin et al. | 260—17.2 |
| 2,886,541 | 5/1959 | Langlois et al. | 260—17.2 |
| 3,294,716 | 12/1966 | Pinney | 260—17.2 |
| 3,355,307 | 11/1967 | Schoenberger et al. | 106—213 |
| 3,487,033 | 12/1969 | McElmury | 260—17.3 |
| 3,524,750 | 8/1970 | Billy | 106—213 |

FOREIGN PATENTS

| | | | |
|---|---|---|---|
| 219,550 | 12/1958 | Australia | 260—17.2 |

OTHER REFERENCES

Tappi, August 1967, vol. 50, No. 8, p. 57A, Maryanski et al., "Partially . . . Swelled . . . Adhesive."

WILLIAM H. SHORT, Primary Examiner

E. WOODBERRY, Assistant Examiner

U.S. Cl. X.R.

161—264